(12) United States Patent
Kai et al.

(10) Patent No.: US 12,529,451 B2
(45) Date of Patent: Jan. 20, 2026

(54) TANK MODULE AND VEHICLE INSTALLED WITH TANK MODULE

(71) Applicant: TOYOTA JIDOSHA KABUSHIKI KAISHA, Toyota (JP)

(72) Inventors: Yuki Kai, Nagoya (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/600,930

(22) Filed: Mar. 11, 2024

(65) Prior Publication Data

US 2024/0353071 A1 Oct. 24, 2024

(30) Foreign Application Priority Data

Apr. 24, 2023 (JP) .................... 2023-071124

(51) Int. Cl.
*B60K 15/07* (2006.01)
*F17C 13/08* (2006.01)

(52) U.S. Cl.
CPC ...... *F17C 13/084* (2013.01); *F17C 2201/056* (2013.01); *F17C 2205/0107* (2013.01); *F17C 2205/0142* (2013.01)

(58) Field of Classification Search
CPC ............ F17C 2205/0142; B60K 15/07; B60K 15/03006
See application file for complete search history.

(56) References Cited

U.S. PATENT DOCUMENTS

2019/0049070 A1    2/2019   Sawai et al.

FOREIGN PATENT DOCUMENTS

JP         2019032071 A      2/2019

OTHER PUBLICATIONS

WO 2023091126; Koonce, Michael; Anderson, Peter; Lauer, Daniel; Buttress, David; Bishop, Donald; May 25, 2023.*

* cited by examiner

*Primary Examiner* — Paul J Gray
(74) *Attorney, Agent, or Firm* — Dickinson Wright, PLLC

(57) ABSTRACT

A tank module, including: a first tank module portion including: plural first tanks disposed in parallel, and a first manifold disposed with an arrangement direction of the plural first tanks as a length direction, and enables flow of fluid between the plural first tanks; a second tank module portion disposed below the first tank module portion, the second tank module portion including: plural second tanks positioned below the plural first tanks, and disposed in parallel, and a second manifold positioned below the first manifold, disposed with an arrangement direction of the plural second tanks as a length direction, and enables flow of fluid between the plural second tanks; a joint portion coupled to the first and second manifold, enabling flow of fluid between the first and second manifold; and a bracket to which the first and second manifold are fixed, and integrating the first and second manifold.

3 Claims, 4 Drawing Sheets

TANK MODULE AND VEHICLE INSTALLED WITH TANK MODULE

CROSS-REFERENCE TO RELATED APPLICATION

This application claims priority under 35 USC 119 from Japanese Patent Application No. 2023-071124, filed on Apr. 24, 2023, the disclosure of which is incorporated by reference herein.

BACKGROUND

Technical Field

The present disclosure relates to a tank module and a vehicle installed with a tank module.

Related Art

Japanese Patent Application Laid-Open (JP-A) No. 2019-032071, discloses technology relating to a tank module in which through-passages (flow paths), through which liquid inside tanks flows, are formed with respect to pipe sleeves that are connected to one axial direction end portions of plural tanks that are disposed in parallel, and in which through-passages can be communicated by pipe sleeves of tanks that are disposed adjacent to each other being linked together.

However, in the above-mentioned prior technology, in cases in which plural tank modules (tank module portions) are coupled together, there is a possibility that relative displacement occurs between the tank module portions.

SUMMARY

The present disclosure provides a tank module and a vehicle installed with a tank module that may suppress relative displacement between plural tank module portions.

A tank module according to a first aspect of the present disclosure includes: a first tank module portion including: plural first tanks disposed in parallel and are structured to be filled with a fluid, and a first manifold disposed with an arrangement direction of the plural first tanks as a length direction, and enables flow of the fluid between the plural first tanks; a second tank module portion disposed below the first tank module portion, the second tank module portion including: plural second tanks positioned below the plural first tanks, the plural second disposed in parallel and are structured to be filled with a fluid, and a second manifold positioned below the first manifold, the second manifold disposed with an arrangement direction of the plural second tanks as a length direction, and enables flow of the fluid between the plural second tanks; a joint portion coupled to the first manifold and the second manifold, the joint portion enabling flow of fluid between the first manifold and the second manifold; and a bracket to which the first manifold and the second manifold are fixed, the bracket integrating the first manifold and the second manifold.

The tank module according to the first aspect of the present disclosure includes a first tank module portion, a second tank module portion, a joint portion, and a bracket. The first tank module portion includes plural first tanks and a first manifold, the plural first tanks are disposed in parallel, and a fluid is filled in the plural first tanks. The first manifold is disposed with an arrangement direction of the plural first tanks as a length direction, and the first manifold enables flow of the fluid between the plural first tanks.

Further, in the first aspect of the present disclosure, the second tank module portion is disposed below the first tank module portion, and includes plural second tanks and a second manifold. The plural second tanks are positioned below the plural first tanks and are disposed in parallel, the plural second tanks are filled with fluid, the second manifold is positioned below the first manifold and is disposed with an arrangement direction of the plural second tanks as a length direction, and the second manifold enables flow of the fluid between the plural second tanks.

In the first aspect of the present disclosure, a joint portion is coupled to the first manifold and the second manifold, and flow of fluid between the first manifold and the second manifold is enabled via the joint portion. Further, a bracket is fixed to the first manifold and the second manifold, and the first manifold and the second manifold are integrated via the bracket.

Therefore, according to the first aspect of the present disclosure, the first tank module portion and the second tank module portion correspond to a single tank module. Further, in the first aspect of the present disclosure, the first manifold and the second manifold are fixed via the bracket, such that the first tank module portion and the second tank module portion are integrated, enabling rigidity as a tank module to be improved. As a result, relative displacement between the first tank module portion and the second tank module portion may be suppressed.

In a tank module according to a second aspect of the present disclosure, in the tank module according to the first aspect, a valve that controls outflow of the fluid may be provided at one length direction end portion of the first manifold or one length direction end portion of the second manifold.

In the tank module according to the second aspect of the present disclosure, a valve is provided at one length direction end portion of the first manifold or one length direction end portion of the second manifold, and outflow of the fluid is controlled by the valve. In the second aspect of the present disclosure, the joint portion is coupled to the first manifold and the second manifold, and fluid flows between the first manifold and the second manifold via the joint portion, such that there is no need to provide a valve for each tank, and the number of components and cost may be reduced.

A tank module according to a third aspect of the present disclosure, in the tank module according to the first aspect, the bracket may include: a first fixing portion fixed to the first manifold; a second fixing portion fixed to the second manifold; and a coupling portion, fixed to a vehicle, which couples the first fixing portion and the second fixing portion.

In the tank module according to the third aspect of the present disclosure, the bracket includes a first fixing portion, a second fixing portion, and a coupling portion. The first fixing portion is fixed to the first manifold, and the second fixing portion is fixed to the second manifold. Further, the coupling portion couples the first fixing portion and the second fixing portion, and the coupling portion is fixed to the vehicle.

In the third aspect of the present disclosure, by fixing the coupling portion to the vehicle in a state in which the first fixing portion is fixed to the first manifold and the second fixing portion is fixed to the second manifold, a single tank module portion in which the first tank module portion and the second tank module portion are integrated via the bracket may be installed at the vehicle.

In a tank module according to a fourth aspect of the present disclosure, in the tank module according to the third aspect, a neck portion, formed with a smaller outer shape than other portions, may be formed at an axial direction end portion of the respective second tanks, the respective first tanks may be formed with a shorter axial direction length than the respective second tanks, and the first manifold is disposed above the plurality of second tanks, the first fixing portion may be formed along the length direction of the first manifold, and the second fixing portion is provided along the length direction of the second manifold, and at the coupling portion, a fastening portion may be disposed between neck portions formed at adjacent second tanks in plan view, and the fastening portion may be fastened to the vehicle.

In the tank module according to the fourth aspect of the present disclosure, a neck portion is provided at an axial direction end portion of each second tank, and the neck portion is formed with a smaller outer shape than other portions. Further, the respective first tanks are formed with a shorter axial direction length than the respective second tanks, and the first manifold is disposed above the plural second tanks. Furthermore, the first fixing portion is formed along the length direction of the first manifold, and the second fixing portion is formed along the length direction of the second manifold. In addition, a fastening portion is provided at the coupling portion, and the fastening portion is disposed between neck portions formed at the second tanks in plan view. The fastening portion is fastened (fixed) to the vehicle via the coupling portion.

Note that, in the fourth aspect of the present disclosure, the neck portion of the respective second tanks is formed with a smaller outer shape than other portions of the respective second tanks, such that a gap is provided between the neck portions of adjacent second tanks. Therefore, in the fourth aspect of the present disclosure, the fastening portion is exposed through the gap when viewed from the vehicle lower side, and workability when fastening the fastening portion to the vehicle may be improved.

In other words, in the fourth aspect of the present disclosure, the fastening portion is exposed through the gap, such that bolt fastening from the vehicle lower side is possible when the tank module is installed at the vehicle, and when compared to bolt fastening from the vehicle upper side there is no component that interferes, and therefore, workability may be improved.

A fifth aspect of the present disclosure is a vehicle including: the tank module according to the above aspects; and a pair of left and right side rails that extend in a vehicle front-rear direction, that configure part of the bracket, and to which the tank module is fastened via a fastening portion that is fastened to a vehicle.

A vehicle installed with a tank module according to the fifth aspect of the present disclosure includes a tank module and a pair of left and right side rails. The side rails extend in the vehicle front-rear direction and configure part of the bracket, and the tank module is fixed to the left and right pair of side rails via a fastening portion that is fastened to a vehicle.

According to the above-described aspects, the tank module and the vehicle installed with a tank module according to the present disclosure may suppress relative displacement between plural tank modules.

BRIEF DESCRIPTION OF THE DRAWINGS

Exemplary embodiments will be described in detail based on the following figures, wherein.

DETAILED DESCRIPTION

Explanation follows regarding a tank module according to an exemplary embodiment of the present disclosure, with reference to the drawings. Note that, in each of the drawings, as appropriate, the arrow FR, the arrow UP, and the arrow RH respectively indicate a frontward direction, an upward direction, and a vehicle right side of a vehicle 12 that is installed with a tank module 10. In the following explanation, unless specifically stated otherwise, simple reference to front-rear, up-down, and left-right directions refers to front and rear in a vehicle front-rear direction, up and down in a vehicle up-down direction, and left and right in a vehicle width direction when facing a travel direction.

Configuration of Tank Module

First, a configuration of the tank module 10 according to the present exemplary embodiment will be explained.

Figure 1:
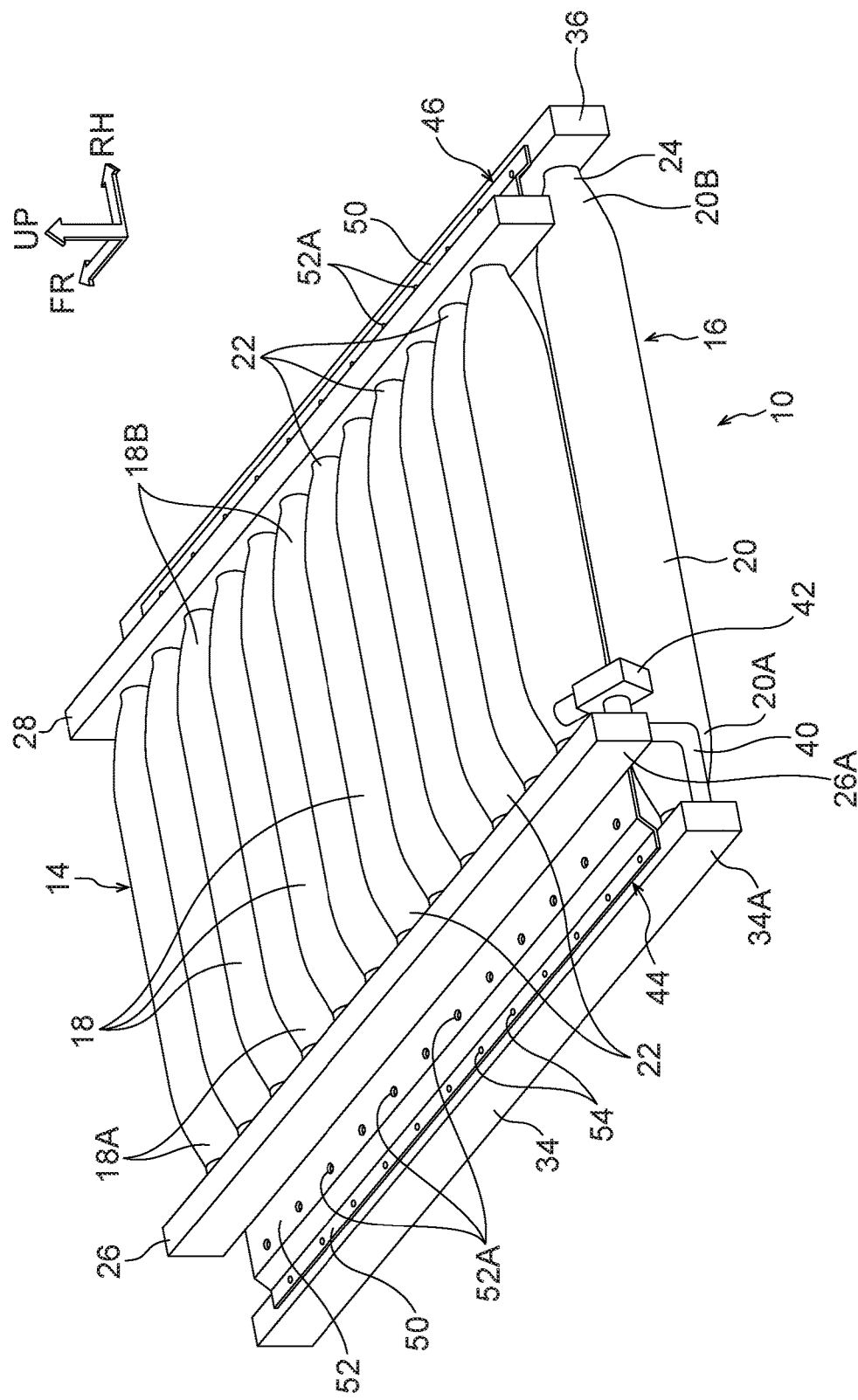
FIG. 1 is a perspective view, as seen from an oblique upper side, of a tank module according to an exemplary embodiment of the present disclosure.

As illustrated in FIG. 1, the tank module 10 includes a tank module portion (first tank module portion) 14 and a tank module portion (second tank module portion) 16, and the tank module portion 14 is disposed above the tank module portion 16.

In the present exemplary embodiment, for example, plural tanks (first tanks) 18 and plural tanks (second tanks) 20 are each disposed in parallel along the vehicle front-rear direction at the tank module portions 14 and 16. The tanks 18 and the tanks 20 are each formed in a substantially cylindrical shape, and the tanks 18 and the tanks 20 each have substantially the same outer diameter dimensions. Neck portions 22, which are formed with a smaller diameter (formed with a smaller outer shape) than other portions of the tanks 18, are formed at both axial direction end portions 18A and 18B of the tanks 18, and neck portions 24, which are formed with a smaller diameter than other portions of the tanks 20, are formed at both axial direction end portions 20A and 20B of the tanks 20. Further, the tanks 18 and the tanks 20 are each formed of, for example, carbon fiber reinforced plastic (CFRP), and are each filled with hydrogen (fluid) as a fuel.

The tanks 20 are formed with a length in the axial direction that is longer than the tanks 18, and the tanks 18 and the tanks 20 are disposed one above the other in a state in which positions of axial direction center portions are aligned. Namely, each axial direction end portion 20A and 20B of the tanks 20 is disposed in a state projecting out further than a respective one of the axial direction end portions 18A and 18B of the tanks 18. Note that the tanks 18 and the tanks 20 are disposed one above the other in a state in which they are offset in the radial direction by a radius of each other.

In the tank module portion 14, a manifold (first manifold) 26 is provided at one axial direction end portion 18A of the respective tanks 18, and a support member 28 is provided at another axial direction end portion 18B of the respective tanks 18. The manifold 26 and the support member 28 are each formed in a substantially rectangular parallelepiped shape, and are each disposed with an arrangement direction (vehicle front-rear direction) of the plural tanks 18 as a length direction of the manifold 26 and the support member 28.

The manifold 26 and the support member 28 are each set with a dimension in a height direction (the vehicle up-down direction) that is larger than a dimension in the width direction (the vehicle width direction), and are formed so as to improve rigidity with respect to force acting along the vehicle up-down direction.

Figure 2:
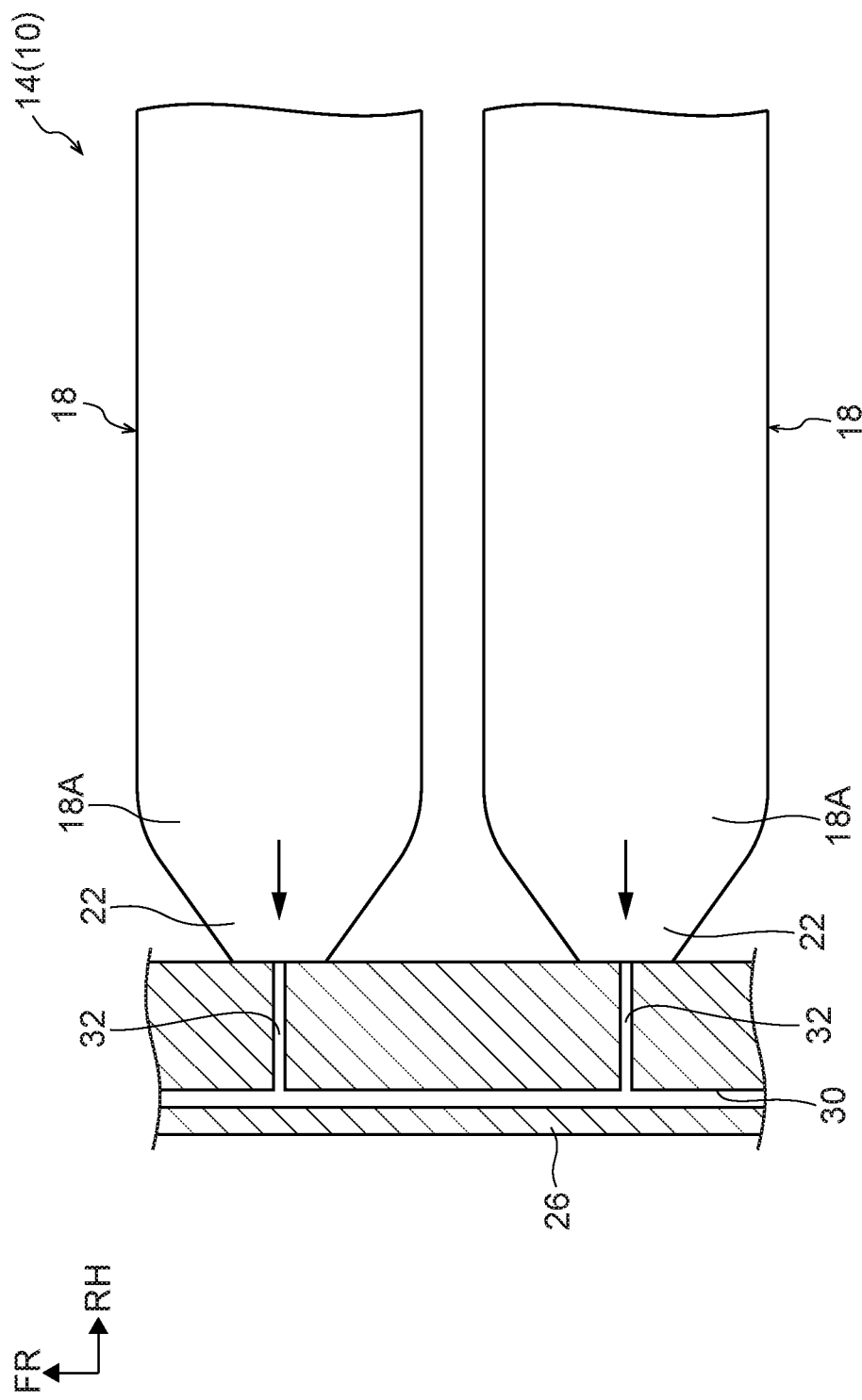
FIG. 2 is a cross-section schematically illustrating a flow path formed in a manifold that configures a portion of the tank module according to the present exemplary embodiment.

As illustrated in FIG. 2, flow paths 30 are formed inside the manifold 26 along the length direction of the manifold 26, and hydrogen inside the tanks 18 is capable of flowing. Further, respective flow paths 32 that are in communication with a flow path formed at a pipe sleeve (not illustrated in the drawings) which is connected to the one axial direction end portion 18A of each tank 18, are formed inside the manifold 26, and each flow path 32 is in communication with the flow path 30.

As illustrated in FIG. 1, a pipe sleeve (not illustrated in the drawings) is connected to the other axial direction end portion 18B of each tank 18. This pipe sleeve is for sealing purposes, and the other axial direction end portion 18B of each tank 18 is connected to the support member 28 in a sealed state via the pipe sleeve.

Similarly to in the tank module portion 14, a manifold (second manifold) 34 is provided at one axial direction end portion 20A of the respective tanks 20, and a support member 36 is provided at another axial direction end portion 20B of the respective tanks 20. The manifold 34 and the support member 36 are each formed in a substantially rectangular parallelepiped shape, and are each disposed with an arrangement direction of the plural tanks 20 as a length direction of the manifold 34 and the support member 36. The manifold 34 and the support member 36 are formed such that their dimensions in the height direction (the vehicle up-down direction) are larger than their dimensions in the width direction (the vehicle width direction).

Similarly to in the manifold 26, flow paths 38 (see FIG. 3) is formed inside the manifold 34 along the length direction of the manifold 34, and hydrogen inside the tanks 20 is capable of flowing. Further, respective flow paths (not illustrated in the drawings) that communicate with the flow paths formed at a pipe sleeve (not illustrated in the drawings) and which is connected to the one axial direction end portion 20A of each tank 20, are formed inside the manifold 34, and each flow path is in communication with the flow path 38.

Further, similarly to the tanks 18, a pipe sleeve (not illustrated in the drawings) is connected to the other axial direction end portion 20B of each tank 20, and the other axial direction end portion 20B of each tank 20 is connected to the support member 36 in a sealed state via the pipe sleeve.

Note that, in the present exemplary embodiment, although the support members 28 and 36 are formed for the purpose of sealing the other axial direction end portions 18B and 20B of the tanks 18 and 20, the support members 28 and 36 may be configured as manifolds. In such a case, for example, it is necessary to form flow paths such that respective flow directions are in one direction between the plural tanks 18 and 20.

On the other hand, in the present exemplary embodiment, one length direction end portion 26A of the manifold 26 and one length direction end portion 34A of the manifold 34 are connected by a joint portion 40. Although not illustrated in the drawings, flow paths through which hydrogen can flow are formed inside the joint portion 40, and the flow path 30 (see FIG. 3) formed inside the manifold 26 and the flow path 38 (see FIG. 3) formed inside the manifold 34 can be communicated with each other.

A valve 42 is provided at a rear face side of the one length direction end portion 26A of the manifold 26. Outflow of hydrogen is controlled by the valve 42, and hydrogen in the tanks 18 and the tanks 20 can be supplied to a fuel cell unit (not illustrated in the drawings). Note that the valve 42 may be provided at the one length direction end portion 34A of the manifold 34, or may be provided at a position other than the one length direction end portion 26A of the manifold 26 or the one length direction end portion 34A of the manifold 34.

Note that, in the present exemplary embodiment, a bracket 44 is provided between the manifold 26 and the manifold 34, and a bracket 46 is provided between the support member 28 and the support member 36. As described above, the tank module portion 14 is disposed above the tank module portion 16. Further, the tanks 20 provided at the tank module portion 16 are formed with a length in the axial direction which is longer than that of the tanks 18 provided at the tank module portion 14, and both axial direction end portions 20A and 20B of the tanks 20 are disposed in a state projecting out further than a respective one of the axial direction end portions 18A and 18B of the tanks 18.

Therefore, in the tank module 10 of the present exemplary embodiment, in front view, the manifold 26 and the support member 28 are each disposed further to an upper side than the manifold 34 and the support member 36, and in plan view, the manifold 34 and the support member 36 are each disposed further toward a vehicle width direction outer side than the manifold 26 and the support member 28.

Figure 3:
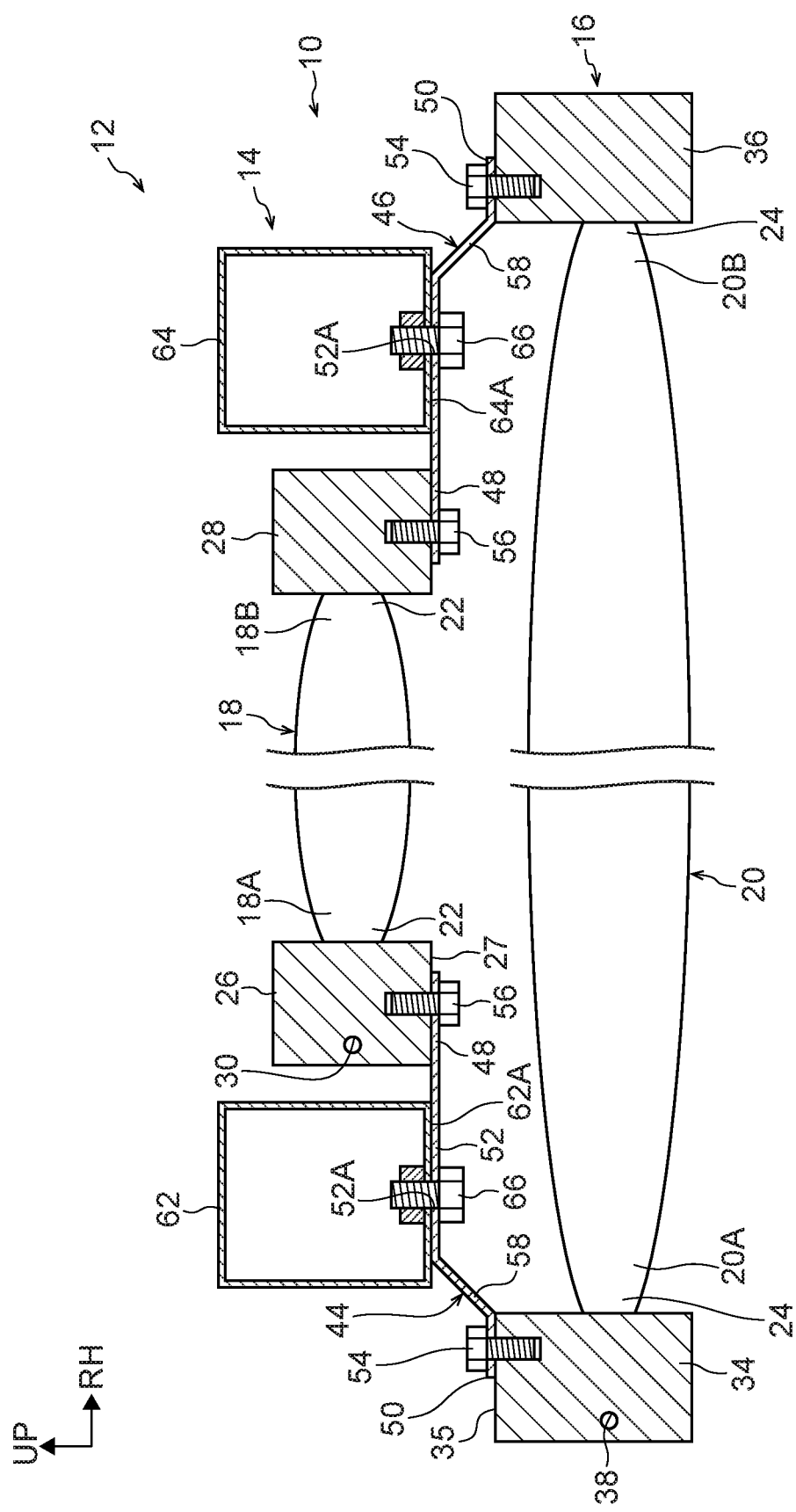
FIG. 3 is a cross-section schematically illustrating a state in which the tank module according to the present exemplary embodiment is installed at a vehicle.

The bracket 44 is formed of a plate material made of metal, and as illustrated in FIG. 3, includes a fixing portion (first fixing portion) 48 that is fixed to the manifold 26, and a fixing portion (second fixing portion) 50 that is fixed to the manifold 34. The fixing portions 48 and 50 are each formed along the length direction of the respective manifolds 26 and 34.

The bracket 44 further includes a coupling portion 52 that couples the fixing portion 48 and the fixing portion 50, and the coupling portion 52 is formed with the same length as the fixing portion 48 and the fixing portion 50. Namely, in the present exemplary embodiment, the bracket 44 is formed by bending a plate material formed in a rectangular shape. The fixing portion 50 is fixed to an upper face 35 of the manifold 34 by bolts 54 or the like, and the fixing portion 48 is fixed to a lower face 27 of the manifold 26 by bolts 56 or the like.

In the present exemplary embodiment, a dimensional difference is provided between the fixing portion 48 and the fixing portion 50 in the up-down direction, and an inclined portion 58 is provided at a fixing portion 50 side of the coupling portion 52 in order to absorb this dimensional difference. The inclined portion 58 is inclined upward toward a manifold 26 side. Forming the inclined portion 58 in this manner enables reaction force to be obtained with respect to a force acting along the up-down direction at the bracket 44, compared to a case in which the inclined portion 58 is formed in a flat plate shape. Note that although the inclined portion 58 is provided at the fixing portion 50 side, the dimensional difference may be absorbed by providing inclined portions at a fixing portion 48 side and the fixing portion 50 side, respectively.

Figure 4:
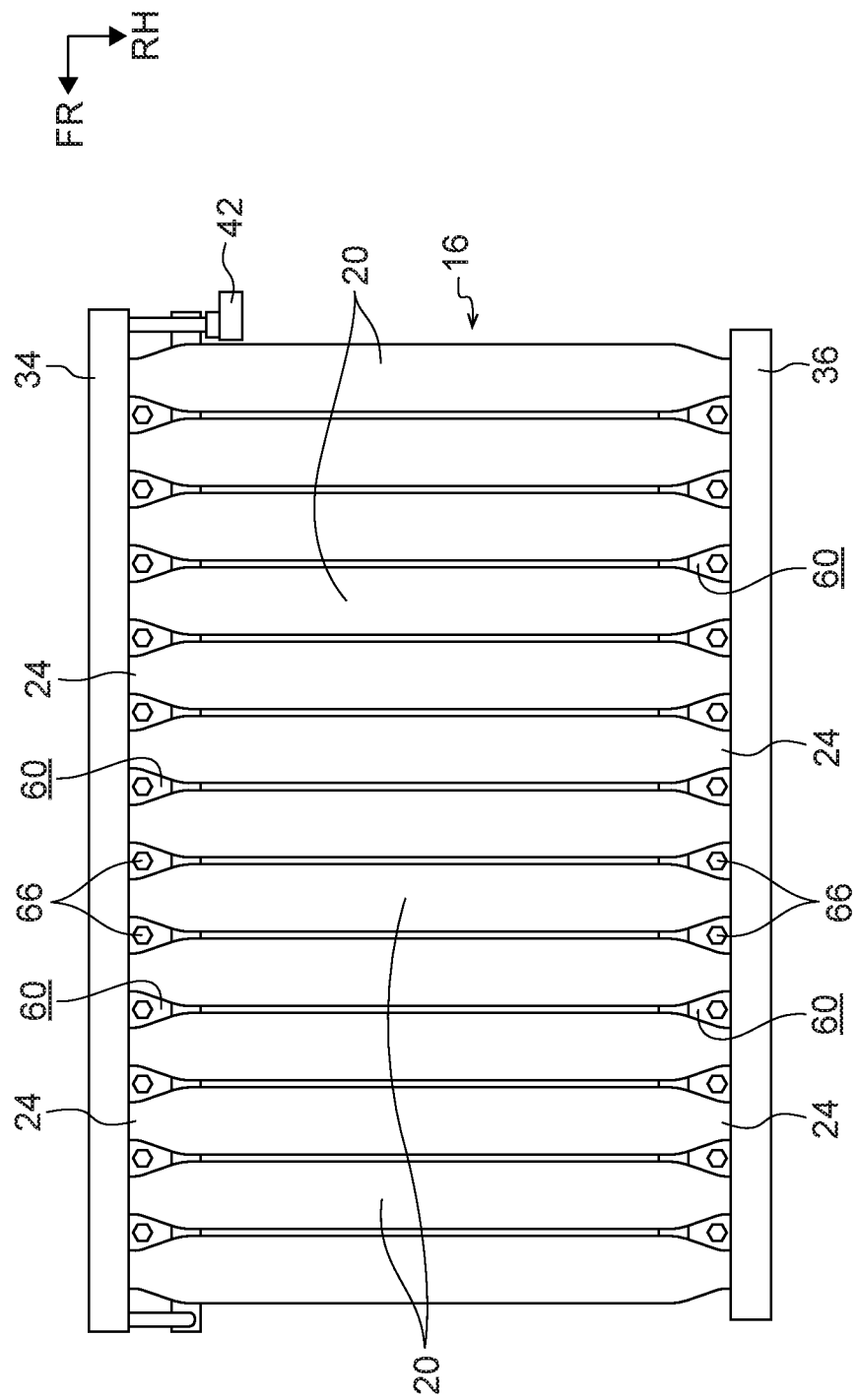
FIG. 4 is a bottom view illustrating the tank module according to the present exemplary embodiment.

As illustrated in FIG. 1, in the present exemplary embodiment, the coupling portion 52 is provided with fastening portions 52A at a predetermined pitch along a length direction of the coupling portion 52. As illustrated in FIG. 4, in a bottom view of the tank module 10, the plural tanks 20 are exposed.

As described above, the tanks 20 have a substantially cylindrical shape, and the neck portions 24 are provided at axial direction end portions of the tanks 20. Therefore, a gap 60 is provided between the neck portion 24 of one tank 20 and the neck portion 24 of an adjacent tank 20. Positions of the fastening portions 52A provided at the coupling portion 52 of the bracket 44 illustrated in FIG. 1 are set such that the fastening portions 52A can be exposed through the gaps 60. Note that the bracket 46 has substantially the same configuration as the bracket 44, and explanation thereof is omitted.

Note that in the present exemplary embodiment, as the vehicle 12 illustrated in FIG. 3, a so-called frame vehicle in which a vehicle body is supported by a ladder frame is applied. The ladder frame includes, a left and right pair of side frames 62 and 64, the respective left and right pair of side frames extending along the vehicle front-rear direction at each vehicle width direction end side, and plural cross members (not illustrated in the drawings) each extending between the left and right pair of side frames 62 and 64. At the fastening portions 52A provided at the coupling portions 52 of the brackets 44 and 46, the coupling portions 52 are fastened (fixed) to a lower surface 62A of the side frame 62 and a lower face 64A of the side frame 64, respectively, by bolts 66 or the like.

As described above, in a state in which the brackets 44 and 46 are fastened to the side frames 62 and 64, respectively, the tank module 10 is fixed to the side frames 62 and 64 via the brackets 44 and 46, and the tank module 10 is installed at the vehicle 12.

Operation of Tank Module

Next, operation of the tank module 10 according to the present exemplary embodiment will be explained.

As illustrated in FIG. 1, the tank module 10 in the present exemplary embodiment includes the tank module portion 14, the tank module portion 16, the joint portion 40, and the brackets 44 and 46. The tank module portion 14 includes the plural tanks 18 and the manifold 26, and the manifold 26 is disposed along the arrangement direction of the plural tanks 18 at a one axial direction end portion 18A side of each of the plural tanks 18. The manifold 26 enables fluid inside the tanks 18 to flow between the plural tanks 18.

Further, the tank module portion 16 is disposed below the tank module portion 14, and includes the plural tanks 20 and the manifold 34. The plural tanks 20 are positioned below the plural tanks 18 and are disposed in parallel, and the manifold 34 is positioned below the manifold 26 and is disposed along the arrangement direction of the plural tanks 20. The manifold 34 enables fluid inside the tanks 20 to flow between the plural tanks 20.

The joint portion 40 is coupled to the manifold 26 and the manifold 34, and fluid can flow between the manifold 26 and the manifold 34 via the joint portion 40.

This enables the tank module portion 14 including the manifold 26 and the tank module portion 16 including the manifold 34 to correspond to a single tank module 10 in the present exemplary embodiment.

In the present exemplary embodiment, the manifold 26 that is provided at the one axial direction end portion 18A side of the tanks 18 and the manifold 34 that is provided at a one axial direction end portion 20A side of the tanks 20 are fixed by the bracket 44. Further, the support member 28 that is provided at another axial direction end portion 18B side of the tanks 18, and the support member 36 that is provided at another axial direction end portion 20B of the tanks 20 are fixed by the bracket 46.

Therefore, in the present exemplary embodiment, the tank module portion 14 and the second tank module portion 16 are integrated together via the brackets 44 and 46, thereby enabling rigidity of the tank module 10 to be improved, and enabling relative displacement to be suppressed between the tank module portion 14 and the tank module portion 16.

Further, in the present exemplary embodiment, the valve 42 is provided at the one length direction end portion 26A of the manifold 26, and fluid outflow is controlled by the valve 42. In the present exemplary embodiment, the joint portion 40 is coupled to the manifold 26 and the manifold 34, and fluid flows between the manifold 26 and the manifold 34 via the joint portion 40, such that there is no need to provide valves for each of the tanks 18 and 20, thereby reducing the number of parts and cost accordingly.

Specifically describing the brackets 44 and 46, in the present exemplary embodiment, as illustrated in FIG. 3, the bracket 44 includes the fixing portion 48, the fixing portion 50, and the coupling portion 52. The fixing portion 48 is fixed to the manifold 26, and the fixing portion 50 is fixed to the manifold 34. Further, the coupling portion 52 couples the fixing portion 48 and the fixing portion 50, and the coupling portion 52 is fixed to a vehicle 12 side. Note that at the bracket 46, the fixing portion 48 is fixed to the support member 28, and the fixing portion 50 is fixed to the support member 36.

In this manner, in a state in which the fixing portion 48 of the bracket 44 is fixed to the manifold 26, the fixing portion 50 of the bracket 44 is fixed to the manifold 34, the fixing portion 48 of the bracket 46 is fixed to the support member 28, and the fixing portion 50 of the bracket 46 is fixed to the support member 36, the tank module portion 14 and the tank module portion 16 are integral with each other.

Therefore, in the present exemplary embodiment, as described above, the tank module portion 14 and the tank module portion 16 constitute a single tank module 10. In this state, the coupling portions 52 of the brackets 44 and 46 are each fixed to the vehicle 12 side. Thus, the tank module 10 is installed at the vehicle 12.

Explanation follows regarding points at which the coupling portions 52 of the brackets 44 and 46 are each fixed to the vehicle 12.

In the present exemplary embodiment, the tanks 18 and the tanks 20 each have a substantially cylindrical shape, and at axial direction end portions of the tanks 18 and the tanks 20, the neck portions 22 and the neck portions 24 each having a smaller diameter than other portions of the tanks 18 and the tanks 20 are formed. Further, the tanks 18 are formed with a shorter length in the axial direction than the tanks 20, and the manifold 26 is disposed above the tanks 20.

As described above, the coupling portion 52 of the bracket 44 is provided with the fastening portions 52A. The fastening portions 52A are disposed between the neck portions 24 formed at the tanks 20 in plan view, and the coupling portion 52 can be fastened to the vehicle 12 via the fastening portions 52A.

In the present exemplary embodiment, although the brackets 44 and 46 are each fastened to a respective one of the left and right pair of side frames 62 and 64 extending along the vehicle front-rear direction, as illustrated in FIG. 4, the neck portions 24 of the tanks 20 are smaller in diameter than other portions of the tanks 20, such that the gap 60 is provided between the neck portion 24 of one tank 20 and the neck portion 24 of an adjacent tank 20. Therefore, when viewed from the vehicle lower side, the fastening portions 52A (see FIG. 1) are exposed through the gaps 60.

In this manner, in the present exemplary embodiment, the fastening portions 52A are exposed, and so workability when fastening the fastening portions 52A to the vehicle 12 may be improved. In other words, in the present exemplary embodiment, the fastening portions 52A are exposed through the gaps 60, such that bolt fastening from the vehicle lower side is possible when the tank module 10 is installed at the vehicle 12, and when compared to bolt fastening from the vehicle upper side there is no component that interferes, and therefore, workability may be improved.

Note that in the present exemplary embodiment, although the tanks 18 and the tanks 20 are disposed along the vehicle width direction, the present disclosure is not limited thereto. The tanks 18 and the tanks 20 may be disposed along the vehicle front-rear direction. In such a case, although not illustrated in the drawings, for example, the brackets 44 and 46 are fixed to cross members disposed at the vehicle front and rear.

In the present exemplary embodiment, although the tanks 18 and the tanks 20 each have a substantially cylindrical shape, the shape of the tanks 18 and the tanks 20 is not limited thereto. The tanks 18 and the tanks 20 may have a substantially square tube shape. Further, although the tanks 18 and the tanks 20 each have the same outer diameter, the present disclosure is not limited thereto.

Furthermore, in the present exemplary embodiment, although the tanks 20 are formed with a longer length in the axial direction than the tanks 18, the present disclosure is not limited thereto. The tanks 20 may be formed with the same length in the axial direction as the tanks 18. In such a case, for example, although the manifold 26 and the manifold 34 are disposed in positions that vertically overlap one another, the bracket 44 is disposed between the manifold 26 and the manifold 34 to fix both of them, and the coupling portion 52 projects out toward the vehicle width direction inner side or the vehicle width direction outer side and is fastened to the vehicle 12.

SUPPLEMENTARY NOTES

Note that the tank module and the vehicle installed with the tank module according to the present disclosure may be configured by appropriately combining the following configurations.

Configuration 1

The tank module includes: a first tank module portion including: plural first tanks disposed in parallel and are structured to be filled with a fluid, and a first manifold disposed with an arrangement direction of the plural first tanks as a length direction, and enables flow of the fluid between the plural first tanks; a second tank module portion disposed below the first tank module portion, the second tank module portion including: plural second tanks positioned below the plural first tanks, the plural second disposed in parallel and are structured to be filled with a fluid, and a second manifold positioned below the first manifold, the second manifold disposed with an arrangement direction of the plural second tanks as a length direction, and enables flow of the fluid between the plural second tanks; a joint portion coupled to the first manifold and the second manifold, the joint portion enabling flow of fluid between the first manifold and the second manifold; and a bracket to which the first manifold and the second manifold are fixed, the bracket integrating the first manifold and the second manifold.

Configuration 2

A valve that controls outflow of the fluid is provided at one length direction end portion of the first manifold or one length direction end portion of the second manifold.

Configuration 3

The bracket includes: a first fixing portion that is fixed to the first manifold; a second fixing portion that is fixed to the second manifold; and a coupling portion that couples the first fixing portion and the second fixing portion, and that is fixed to a vehicle.

Configuration 4

A neck portion, which is formed with a smaller outer shape than other portions, is formed at an axial direction end portion of the respective second tanks; the respective first tanks are formed with a shorter axial direction length than the respective second tanks, and the first manifold is disposed above the plural second tanks; the first fixing portion is formed along the length direction of the first manifold, and the second fixing portion is provided along the length direction of the second manifold; and at the coupling portion, a fastening portion is disposed between neck portions formed at adjacent second tanks in plan view, and the fastening portion is fastened to the vehicle.

Configuration 5

A vehicle including: the tank module according to any one of the above configurations 1 to 4; a pair of left and right side rails that extend in a vehicle front-rear direction, that configure part of the bracket, and to which the tank module is fastened via a fastening portion that is fastened to a vehicle.

In addition, the present disclosure may be implemented with various modifications within a range not departing from the gist of the present disclosure. Further, it is needless to say that the scope of rights of the present disclosure is not limited to the above-described exemplary embodiment or the above-described modified examples.

What is claimed is:
1. A tank module, comprising:
a first tank module portion including:
a plurality of first tanks disposed in parallel and are structured to be filled with a fluid, and
a first manifold disposed with an arrangement direction of the plurality of first tanks as a length direction, and enables flow of the fluid between the plurality of first tanks;
a second tank module portion disposed below the first tank module portion, the second tank module portion including:
a plurality of second tanks positioned below the plurality of first tanks, the plurality of second tanks disposed in parallel and are structured to be filled with a fluid, and
a second manifold positioned below the first manifold, the second manifold disposed with an arrangement direction of the plurality of second tanks as a length direction, and enables flow of the fluid between the plurality of second tanks;
a joint portion coupled to the first manifold and the second manifold, the joint portion enabling flow of fluid between the first manifold and the second manifold; and
a bracket to which the first manifold and the second manifold are fixed, the bracket integrating the first manifold and the second manifold;
wherein the bracket comprises:
a first fixing portion fixed to the first manifold;
a second fixing portion fixed to the second manifold; and a coupling portion, fixed to a vehicle, which couples the first fixing portion and the second fixing portion; and wherein:

a neck portion, formed with a smaller outer shape than other portions, is formed at an axial direction end portion of the respective second tanks, the respective first tanks are formed with a shorter axial direction length than the respective second tanks, and the first manifold is disposed above the plurality of second tanks, the first fixing portion is formed along the length direction of the first manifold, and the second fixing portion is provided along the length direction of the second manifold, and at the coupling portion, a fastening portion is disposed between neck portions formed at adjacent second tanks in plan view, and the fastening portion is fastened to the vehicle.

2. The tank module according to claim 1, wherein a valve that controls outflow of the fluid is provided at one length direction end portion of the first manifold or one length direction end portion of the second manifold.

3. A vehicle, comprising:

the tank module according to claim 1; and a pair of left and right side rails that extend in a vehicle front-rear direction, that configure part of the bracket, and to which the tank module is fastened via a fastening portion that is fastened to the vehicle.

* * * * *